US008788764B2

(12) United States Patent
Williams et al.

(10) Patent No.: US 8,788,764 B2
(45) Date of Patent: Jul. 22, 2014

(54) ACCESS CONTROLLER FOR STORAGE DEVICES

(75) Inventors: James A. Williams, Sunnyvale, CA (US); William Bridge, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1646 days.

(21) Appl. No.: 10/681,618

(22) Filed: Oct. 8, 2003

(65) Prior Publication Data

US 2005/0081009 A1 Apr. 14, 2005

(51) Int. Cl.
*G06F 12/00* (2006.01)
(52) U.S. Cl.
CPC ...................................... *G06F 12/00* (2013.01)
USPC .......................................... 711/154; 711/170
(58) Field of Classification Search
CPC ....................................................... G06F 12/00
USPC ..................... 711/154, 170, 173, 100, 4, 112; 710/240, 244, 3
See application file for complete search history.

(56) References Cited

U.S. PATENT DOCUMENTS

| 6,137,644 | A | 10/2000 | Hetzler et al. |
| 6,256,705 | B1 * | 7/2001 | Li et al. .......................... 711/112 |
| 6,324,620 | B1 * | 11/2001 | Christenson et al. .......... 711/112 |
| 6,490,635 | B1 * | 12/2002 | Holmes ............................. 710/3 |
| 6,587,881 | B1 | 7/2003 | Agarwal et al. |
| 6,671,772 | B1 * | 12/2003 | Cousins ......................... 711/112 |
| 2002/0138670 | A1 * | 9/2002 | Johnson ............................. 710/6 |
| 2004/0223722 | A1 * | 11/2004 | Chamberlin et al. ............ 386/46 |

FOREIGN PATENT DOCUMENTS

JP 09321962 * 12/1997 .............. G06F 12/00

* cited by examiner

*Primary Examiner* — Matthew Bradley
(74) *Attorney, Agent, or Firm* — Kraguljac Law Group, LLC (57) ABSTRACT

Systems, methodologies, components, and other embodiments associated with controlling access to a storage device are described. One example system embodiment comprises an access controller configured to control access requests to the storage device by metering access to data within a first region within the storage device and by allowing unmetered access to data within a second region within the storage device.

32 Claims, 5 Drawing Sheets

Figure 9

ACCESS CONTROLLER FOR STORAGE DEVICES

BACKGROUND

From a product performance perspective, technological progress of disk drives can be measured with three metrics; storage capacity, peak data transfer rate, and head seek time. As an example, considering one major disk drive family over a nine-year period, capacity increased 32 times, maximum transfer rate increased eight times, but full-head seek time decreased 1.6 times. As a result, the disparity between capacity improvements and head seek times has led to a degradation to overall system performance.

Some system designs have attempted to improve storage response times by adding cache memory inside disk drives. However, adding hardware increases system cost and also requires additional functionality to properly manage the cache memory. Other designs take advantage of regional placement of data near a disk's perimeter. Data placed near the perimeter of a disk drive platter has faster transfer rates than data placed near the hub of the disk drive. However, disk throughput improvements from intelligent data placement often degrade with changes in workload.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a storage medium that stores instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, combinations of these, one or more of these, and so on. A data store may reside in one logical and/or physical entity and/or may be distributed between two or more logical and/or physical entities. A data structure can also be referred to as a data store.

"Logic", as used herein, includes but is not limited to hardware, firmware, software stored on a computer-readable storage medium and/or combinations of each to perform a function(s) or an action(s), and/or to cause a function or action from another component. For example, based on a desired application or needs, logic may include a software controlled microprocessor, discrete logic like an application specific integrated circuit (ASIC), a programmed logic device, a memory device containing instructions, or the like. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communication flow, and/or logical communication flow may be sent and/or received. Typically, an operable connection includes a physical interface, an electrical interface, and/or a data interface, but it is to be noted that an operable connection may include differing combinations of these or other types of connections sufficient to allow operable control.

"Signal", as used herein, includes but is not limited to one or more electrical or optical signals, analog or digital, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained as part of a computer-readable medium as defined previously. Another form of the software may include signals that transmit program code of the software to a recipient over a network or other communication medium.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

In one embodiment, a system for intelligent management of the workload placed on a storage device is provided. For purposes of explanation, the storage device will be described as a disk drive but it will be appreciated that other types of storage devices, such as any type of computer-readable medium, can be used. One example configuration of a disk drive includes one or more drive platters that magnetically or optically store data. Two characteristics of disk drives that may affect performance are that data placed near the perimeter of a disk drive platter has a faster transfer rate than data placed near the hub of the disk drive, and that it takes less time to move the drive read/write head between neighboring tracks than it does to seek across the full platter. It will be appreciated that the region of a disk drive near the perimeter has greater data density. As a result, access may be faster because fewer seeks are required to neighboring blocks. Most computer systems, at any given point in time, may have some data that is actively accessed (also referred to as hot data), and other data that is not actively accessed (also referred to as cold data). Regions or areas of the disk drive that contain hot data will be referred to as hot regions and regions or areas containing cold data will be referred to as cold regions. As one example, hot data can be data needing preferred access to achieve optimal application performance. Hot data may or may not be important, and important data may at times be placed in the cold region. Other examples will be described below.

Figure 1:
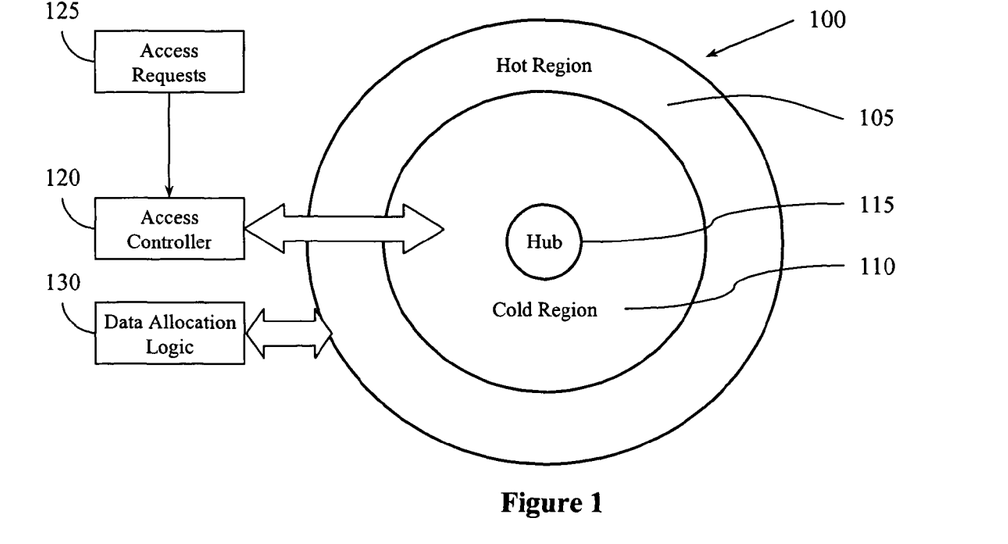
FIG. 1 illustrates an example storage device having an example access controller.

Illustrated in FIG. 1 is one example of a platter 100 of a disk drive that is configured with a hot region 105 and a cold region 110. In one example, the hot region 105 is allocated to locations on the platter 100 near or adjacent to its perimeter and the cold region 110 is allocated to locations closer to or adjacent a hub 115 of the platter 100. In one example, data that is actively accessed (e.g. more frequently accessed, or more important data) can be placed within the hot region 105 in an effort to increase performance such as system response time for hot data access requests. Data that is less actively accessed (e.g. less frequently accessed, or less critical data) can be placed closer to the hub 115 in the cold region 110. The importance of data may not necessarily be a deciding factor in determining its placement. For example, cold data can be important such as backup data, but can be placed in the cold region because a backup request can be performed at any desired time, performed with non-critical response times, performed less actively, and/or for other like reasons. Access requests directed to the hot region will be referred to as hot access requests and those directed to the cold region will be referred to as cold access requests.

In one example, an access controller 120 can be configured to control access requests to the storage device/platter 100 by metering selected access requests 125. For example, as access requests 125 are received from one or more requesting sources, the access controller 120 can be configured to meter cold access requests associated with the cold region 110. A requesting source may be an application, a database, an operating system, a process, any type of software, logic device, or the like. Cold access requests can be metered by, for example, limiting the number of processed cold access requests, giving priority to hot access requests, postponing cold access requests, or otherwise allowing hot access requests to be processed in an unmetered fashion while cold access requests are restricted to a desired extent. In this manner, if the number of cold access requests increases to a level that may affect the response time for processing hot access requests, the access controller 120 can limit the number and/or rate of cold access requests being processed. In another example, cold access requests can also be metered by size. Large requests (e.g. accessing large amounts of data) directed to the cold region 110 can be broken into smaller requests so that one large cold request does not lock out or undesirably delay a subsequent hot request. Thus, response time for hot access requests can be optimized or at least maintained within a selected performance range by controlling the processing of cold access requests. The access controller 120 can be regarded as a data access governor for access requests directed to the cold region 110.

In the examples described herein, it will be appreciated that access requests can also be referred to as input/output (I/O) requests that may include read requests, write requests, and/or any other type of request associated with an operation that can be performed on a storage device. It will further be appreciated that a storage device can be configured to include one or more hot regions and/or one or more cold regions. A hot or cold region may or may not be contiguous, and may be defined by one or more logical or physical addresses. The storage device may also be configured to include multiple storage devices and may include multiple disk platters. It will be appreciated that a storage device that is defined with a hot region and a cold region can be managed as two storage devices, one fast device (hot region) and one slower device (cold region).

With reference again to FIG. 1, in another example, the system may include a data allocation logic 130 configured to place data within a selected region within the platter 100. For example, applications that are important or critical to a computer system can have data they access placed within the hot region 105 to ensure preferential access to the storage device. Less important applications or less critical data can be allocated and placed within the cold region 110. Knowledge of which applications and/or which data are associated to the hot region 105 or the cold region 110 can be used by the access controller 120 when determining which of the access requests 125 to meter. For example, knowledge of an application at allocation time can be used to decide where to place the data associated with the application. Then, knowledge of the application at I/O time may not be necessary since the placement can be used to determine if the access request is hot or cold. The data allocation logic 130 may also include an interface (not shown) that allows a user (not shown) to select or define which applications and/or data are to be allocated to the hot region 105 or the cold region 110. The data allocation logic 130 may also include logic that allows a configurable threshold to be set to control when metering is to be initiated and/or control the level of metering performed by the access controller 120. Setting and using a threshold will be further described in other examples below. In another example, the data allocation logic 130 can use knowledge of which application as a mechanism for data placement.

Figure 2:
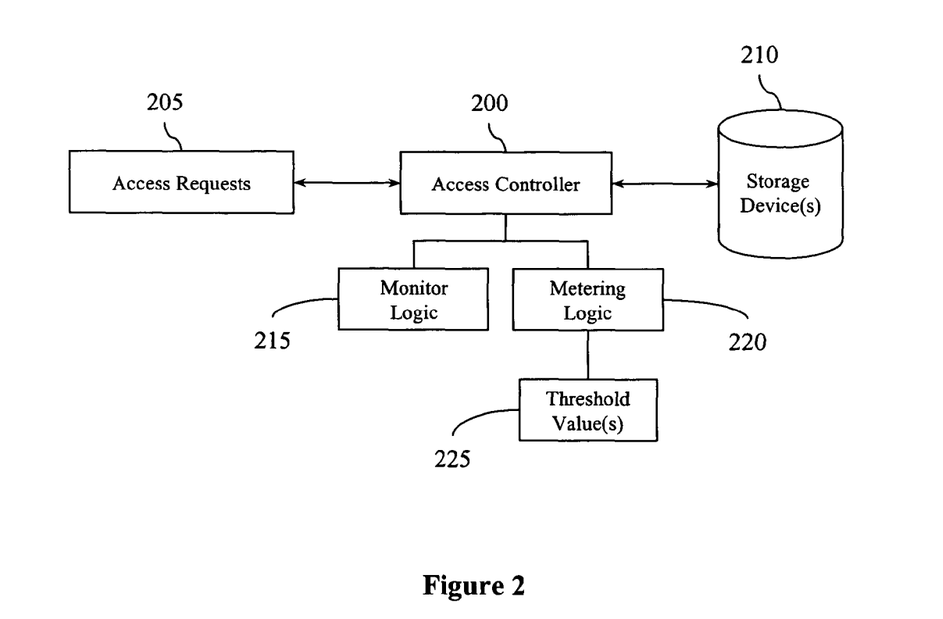
FIG. 2 illustrates another example configuration of an access controller for a storage device.

Illustrated in FIG. 2 is another example of an access controller 200 configured to control access requests 205 directed to a storage device 210. The access controller 200 can include a monitor logic 215 that can be configured to monitor the access requests 205 such as by counting and tracking the number of cold access requests. A metering logic 220 can be configured to initiate metering of cold access requests in response to a triggering event. For example, the triggering event may be when the number of cold access requests reaches or exceeds a predefined threshold value(s) 225. The threshold value(s) 225 can represent a number of cold access requests that are permitted without being metered, may represent a rate of cold access requests permitted, or other desired value that can be used to trigger the metering of the cold access requests.

As another example, multiple levels of thresholds can be defined that can increase the level of metering performed on the cold access requests. Thus, the level of metering can dynamically change based on system conditions. For example, suppose the activity of hot access requests increases (based on a threshold), thus requiring additional processing. The level of metered cold access requests (which can be another threshold) can be dynamically increased to allow more processing time for the hot access requests. In critical time periods with a high volume of hot access requests, the access controller 200 can even temporarily delay or stop all cold access requests. A range of permitted delay times could be specified by a user.

In another configuration, a filter (not shown) can be used to filter the access requests 205 based on their type (hot or cold). Cold access requests can be directed to the access controller 200 where they may or may not be metered while hot access requests can be processed to the storage device 210 without metering.

Figure 3:
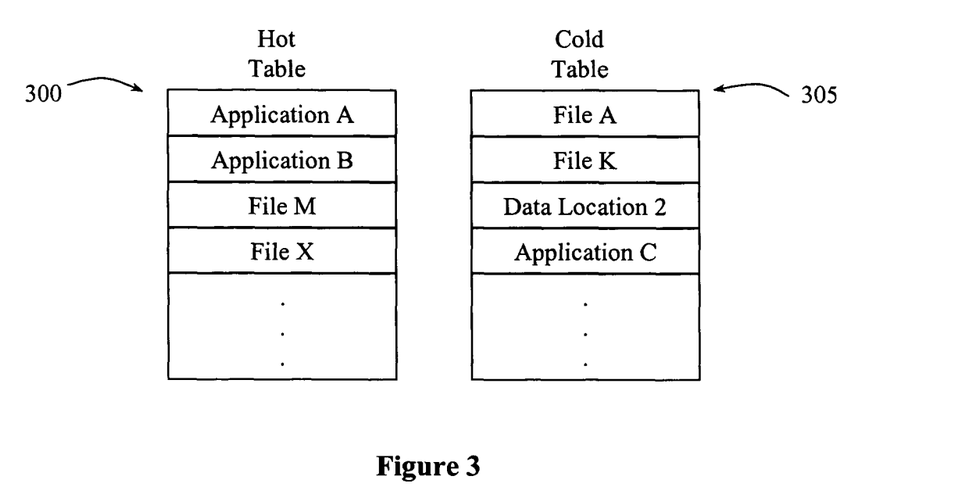
FIG. 3 illustrates an example data structure that may be used by an access controller to determine the type of access request received.

Illustrated in FIG. 3 is one example of a mechanism that can be used to determine and identify the type of access request that is received by the access controller (e.g. 120, 200). In one embodiment, the mechanism may include at least one data store such as a hot table 300 and a cold table 305. The hot table 300 and the cold table 305 can be configured to identify one or more of: applications, files, data, and storage device regions that can be associated with either a hot access request or a cold access request. For example, the cold table 305 can be configured with identification data that indicates file "A" has been allocated to a cold region on a storage device. Thus, the access controller 200 can determine that an access request associated with file "A" is a cold access request.

In another example, the cold table 305 can define data locations based on addresses that define the cold region of a storage device. For example, "data location 2" may represent one or more addresses that can be compared with addresses within an access request to determine whether the access request is directed to a cold region. In another example, the cold table 305 can identify an application such as application "C" which may indicate that all access requests associated with application "C" will be treated as a cold access request. Similarly, the hot table 300 can be defined with identification data used to identify hot access requests.

It will be appreciated that other configurations and/or data structures can be used to implement the mechanism to identify hot and cold access requests. For example, one data structure can be used to identify either the hot or cold identification data where data not found in the structure is assumed to be associated with the other type of access request. In another example, a logical and/or physical address within the storage device can be defined such that all access requests to locations above (or below) the defined address are treated as cold access requests. Of course, multiple addresses can be defined and address ranges can be used to define the cold regions, the hot regions, or both.

Figure 4:
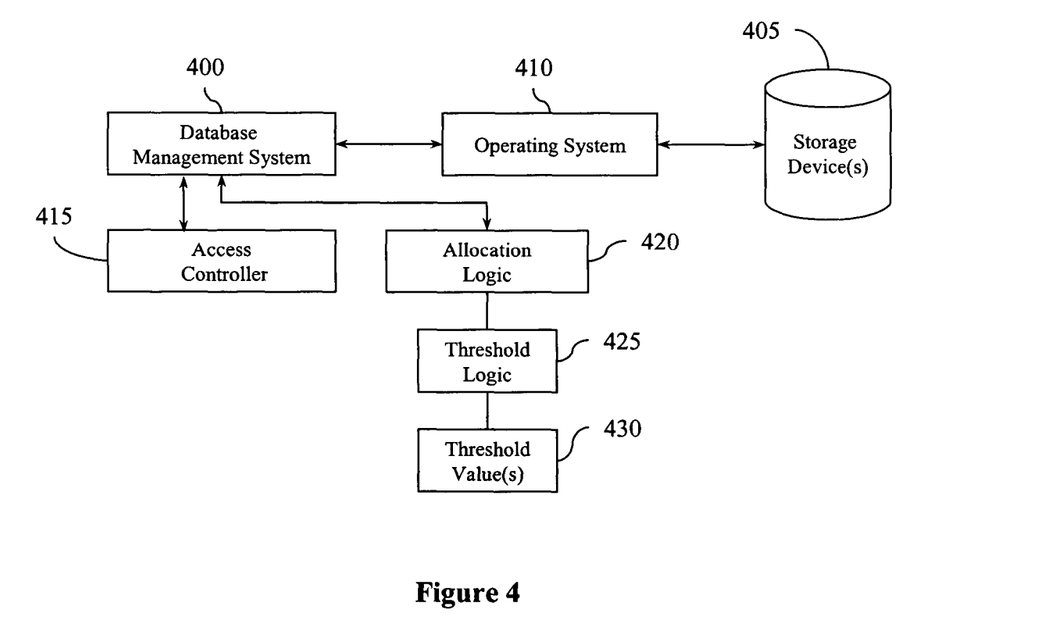
FIG. 4 illustrates an example database management system environment in which example systems and methods illustrated herein can operate.

Illustrated in FIG. 4 is one embodiment of database software environment, like a database management system 400, configured to process data access requests from one or more applications, users, and/or components to one or more storage device(s) 405. It will be appreciated that the database management system 400 can include a complex set of software programs that control and manipulate data files. In one example, the database management system 400 accepts data access requests and instructs an operating system 410 to process the data with the storage device(s) 405 in accordance with the access request.

One component of the database management system 400 can include an access controller 415 configured to process access requests to the storage device 405. The access controller 415 can include logic configured to meter access requests to a selected region in the storage devices 405 such as a requests to a cold region as previously described. To define the various types of regions in the storage devices 405, an allocation logic 420 can be provided that is configured to define a plurality of regions within the storage device(s) 405. For example, the allocation logic 420 can allow a user to allocate selected regions within the storage device(s) 405 and assign them to be hot regions or cold regions. The regions can also be allocated or defined programmatically based on one or more configurable parameters. For example, a configurable parameter may be set that automatically allocates 60% of the address space on the storage device 405, that is adjacent to the perimeter of a disk platter within the storage device 405, as the hot region and the remaining address space is allocated as a cold region.

The system can also include a threshold logic 425 that is configured to assign a metering threshold to one or more selected regions of the regions defined by the allocation logic

420. In a simple example, a hot region and a cold region is defined within the storage device 405 and a metering threshold is assigned to the cold region. Thus, when the number of access requests directed to the cold region increases beyond the metering threshold, the access controller 415 can initiate metering of the access requests to the cold region which may help to optimize the response time for access requests to the hot region.

In another example, the allocation logic 420 can be configured to associate one or more priority levels with data, files, and/or applications. The priority levels can be used to direct the placement of data into one of the defined regions (e.g. hot region or cold region). For example, if a set of data is identified to have a high priority, it can be stored within the hot region of the storage device 405 so that access requests directed to the data are not metered. Data associated with a low priority can be stored in the cold region of the storage device 405 which may cause the associated access requests to being metered. As explained previously, metering may include limiting a number of access requests directed to the cold region from being processed. The allocation logic 420 can be further configured to cause selected data to be placed within a selected region in the storage device 405 based on a frequency of access to the selected data. For example, if a selected data is to be actively accessed, the selected data can be placed within the hot region of the storage device 405.

Figure 5:
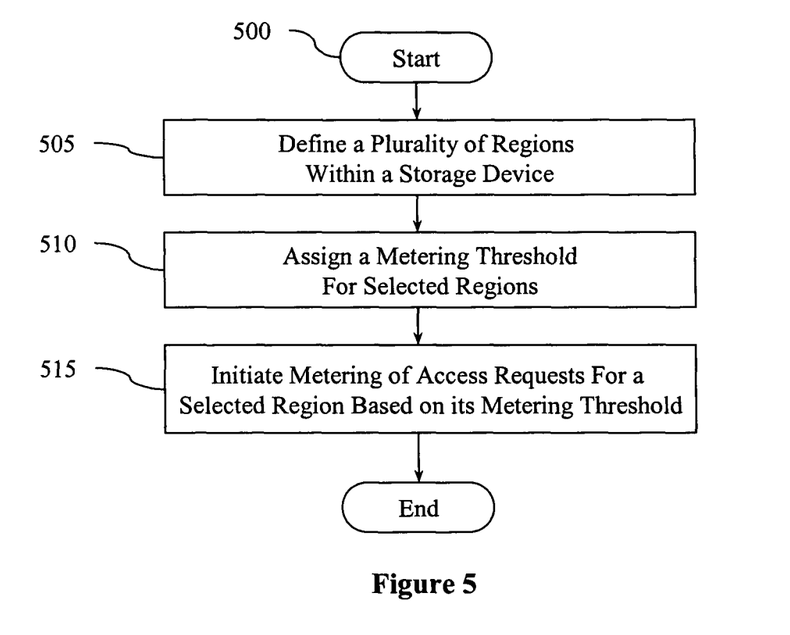
FIG. 5 illustrates an example methodology for metering access requests.
Figure 6:
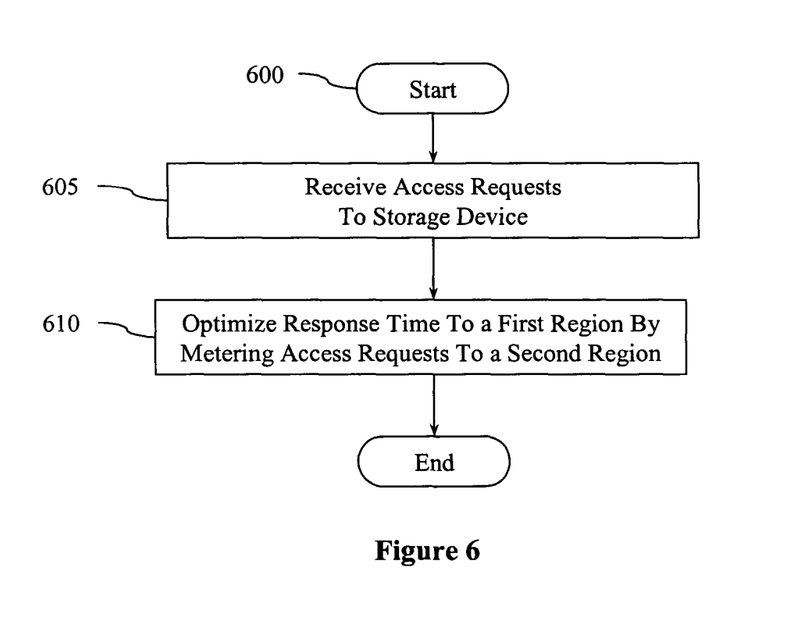
FIG. 6 illustrates another example methodology for metering access requests.
Figure 7:
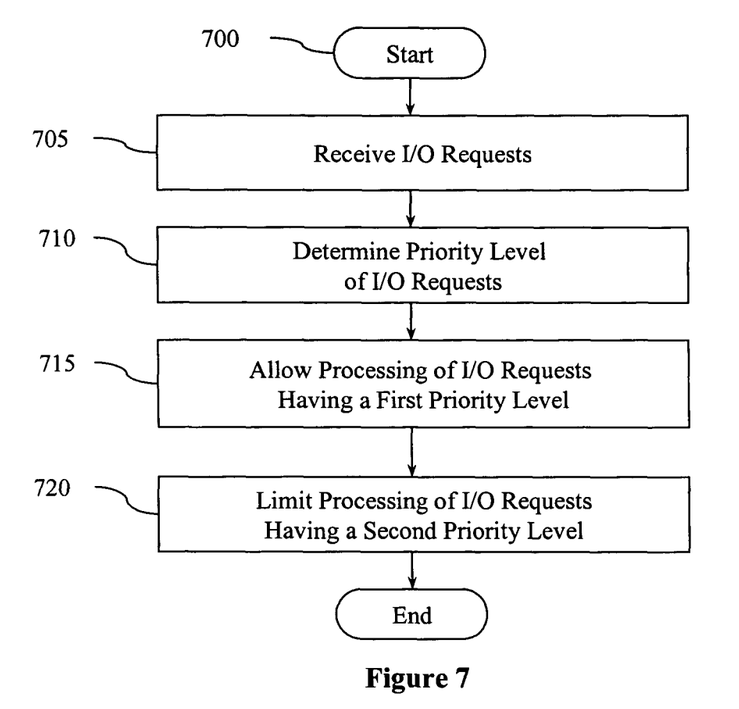
FIG. 7 illustrates another example of metering access requests based on priority levels.

Example methods may be better appreciated with reference to the flow diagrams of FIGS. 5, 6 and 7. While for purposes of simplicity of explanation, the illustrated methodologies are shown and described as a series of blocks, it is to be appreciated that the methodologies are not limited by the order of the blocks, as some blocks can occur in different orders, at different times, and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software components may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

With reference to FIG. 5, one example of a methodology 500 is illustrated that may be used for configuring a storage device to be controlled by a metering system. Initially, a multiple regions within a storage device can be defined (Block 505). For example, this may include designating selected regions as hot regions or cold regions. It will also be appreciated that defining only one region (e.g. a cold region) can inherently define all other regions as hot. For a selected region (e.g. the cold region), a metering threshold can be assigned (Block 510). As access requests are received by this system, the access requests can be monitored to determine whether cold access requests have exceeded the assigned metering threshold. If the metering threshold is exceeded, meaning that the activity of access requests for the cold region has increased beyond a desired level, metering of the cold access requests can be initiated. It will be appreciated that the metering step (Block 515) can be triggered and executed separate from the other blocks 505 and 510.

In one example, a metering threshold can be defined to allow only one cold access request to be processed for every ten access requests. If two cold access requests are received before ten hot access requests are processed, one of the cold access requests would be metered and restricted from being processed until the next interval of hot access requests. In another example, the metering threshold can define that only five cold access requests can be processed in any ten second interval. Additionally, a parameter can be set that defines a maximum delay permitted for cold access requests.

Illustrated in FIG. 6 is an example methodology 600 that can be associated with metering of access requests. For example, the method 600 can be implemented by any of the access controllers described herein. The method begins when access requests to a storage device are received (Block 605). Response time for access requests directed to a first region within the storage device can be optimized by metering access requests associated with a second region in the storage device (Block 610). In this example, the first region may include a hot region and the second region can include a cold region. Thus, by metering or otherwise limiting a number of access requests directed to the cold region that are processed, the access requests directed to the hot region may receive improved response times. It will also be appreciated that metering the access requests to the cold region can at least maintain a desired level of performance when processing the access requests directed to the hot region. In this manner, optimizing the response time can also include avoiding or limiting the chances that the response time is decreased or detrimented due to increased activity of cold access requests.

Illustrated in FIG. 7 is another example methodology 700 that can control access to a storage device. When input/output (I/O) requests are received (Block 705), a priority level of the I/O requests are determined (Block 710). The priority level can be used to determine how to process its corresponding I/O request. In one example, the priority level can indicate whether the I/O request is a hot access request or a cold access request as previously described. The priority level can also be indicated as a numeric value or other type of parameter. In another example, the priority level of an I/O request can be determined based on characteristics of the I/O request. For example, the characteristics can include the application that generated the I/O request, the file being accessed, the location on the storage device, and the like. As described in a previous example, these types of characteristics can be predefined or associated with a hot request or a cold request.

Once the priority level is determined for an I/O request, requests having a first priority level (e.g. a hot request) can be allowed to be processed (Block 715). If an I/O request has a second priority level (e.g. a cold request), processing of that I/O request can be limited (Block 720). For example, the processing can be limited by metering or otherwise restricting the processing of I/O requests having the second priority level. In another example, the limiting may include restricting the I/O requests having the second priority level based on a threshold number of acceptable I/O requests. Thus, if the number of cold access requests increases beyond a predefined threshold, those access requests can be restricted so as to not detriment the processing of the hot access requests.

The priority level of an I/O request can also be determined based on a location of data within the storage device being accessed. For example, a hot region in the storage device can have a first priority level and a cold region can have a second priority level. Then, the priority level of an I/O request can be determined based on which region will be accessed. From another perspective, the priority level of data within the storage device can be assigned or determined based on which region the data is contained in. In one configuration, data located adjacent a perimeter of a disk platter can receive a first priority level (e.g. hot, high). Data located adjacent or closer to a hub of the disk platter can receive a second priority level (e.g. cold, low). As previously explained, the different regions within the storage device can be defined or allocated by setting one or more predetermined addresses within the storage device.

In another example of metering, the servicing or processing of cold requests can be delayed even if there are no hot requests currently received or pending. One reason to do this can cause the disk head to remain in the area of the hot region in case a hot request arrives. When the next hot request arrives, the disk head will already be positioned in the hot region to provide prompt response time.

Figure 8:
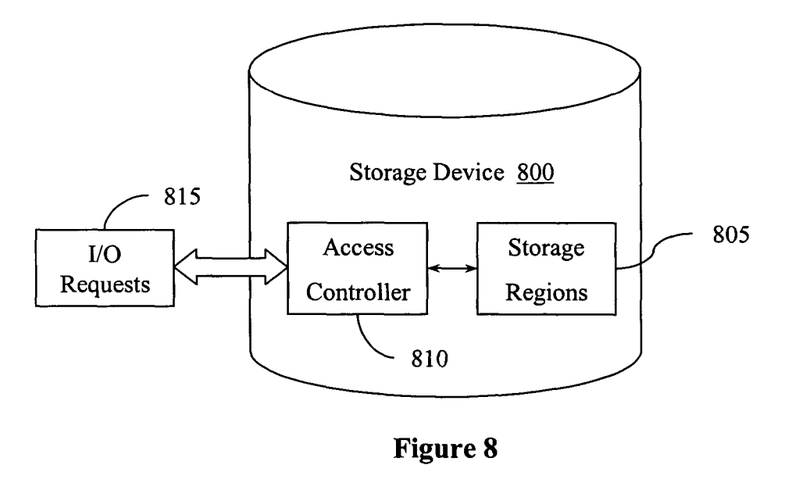
FIG. 8 illustrates an example storage device environment in which example systems and methods illustrated herein can operate.

Illustrated in FIG. 8 is another example configuration of a system for controlling access to a storage device 800. The storage device 800 can be configured with one or more storage regions 805 such as a hot region and a cold region as described previously. If the storage device 800 is a disk drive with multiple disk platters, each platter can be configured with a hot region and a cold region. Of course, it will be appreciated that each platter can include any number of defined regions including zero. An access controller 810 can be configured to meter I/O requests 815 received by the storage device 800. For example, I/O requests directed to a defined cold region within the storage device 800 can be metered in order to allow processing of other I/O requests. By allowing only a predefined number or rate of I/O requests to the cold region to be processed, response time and/or performance for processing I/O requests directed to the hot region can be at least controlled or maintained within a desired performance range and may assist in optimizing the response time. The access controller 810 can be integral with the storage device 800 and can be implemented in any desired form of logic within the storage device 800.

Figure 9:
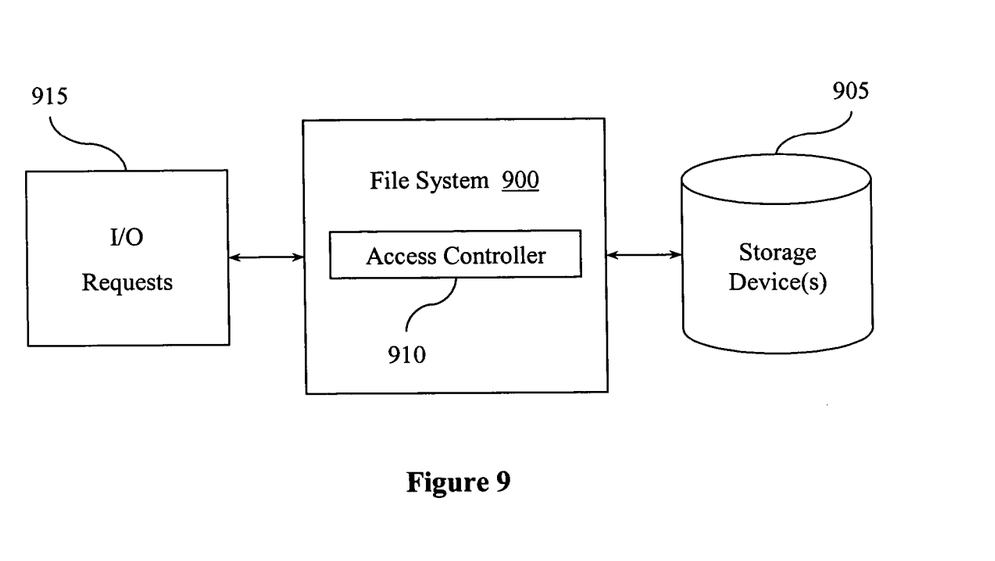
FIG. 9 illustrates an example file system environment in which example systems and methods illustrated herein can operate.

Illustrated in FIG. 9 is another example configuration of a system for controlling access requests that is embodied within a file system 900 of a computer. The file system 900 can be configured to organize and manipulate data and/or files on one or more storage devices 905 in communication with the file system 900. An access controller 910 can be configured as part of the file system 900 to control input/output requests 915 directed to one of the storage devices 905. Similar to the examples previously described, the access controller 910 can be configured to meter I/O requests 915 directed to cold regions or low priority regions within the storage device 905. I/O requests 915 directed to hot regions or high priority regions can be processed without being metered.

It will be appreciated that the components described herein may be implemented in a variety of ways. For example, any of the example access controllers can be implemented in a desired form of software and/or logic and may be maintained and/or transmitted using any desired form of computer-readable medium. The access controller may also be configured or integrated as an internal component within other computer components, such as a data base system, a file system, an operating system, an application or other type of software, and storage device, or may be logically or physically external to such components and be operably connected thereto.

In one example, methodologies described herein can be implemented as processor executable instructions and/or operations stored on a computer-readable medium that cause a computer, processor, or other device to respond or behave in a desired manner. Thus, in one example, a computer-readable medium may store processor executable instructions operable to perform a method that includes FIGS. 5, 6, and/or 7, and may include variations of these methods. While the above methods are described being implemented and stored on a computer-readable medium, it is to be appreciated that other example methods and/or functionalities described herein associated with the system figures can also be implemented and stored on a computer-readable medium.

It will be further appreciated that the example systems and methods can be implemented as part of a computer or other electronic device. The computer can include one or more processors, memories, disks, input/output ports, and network interfaces operably connected by a bus. The computer may include an access controller similar to the example systems described herein. The example access controllers and any of its components can be implemented in any desired form of logic or software.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modem Legal Usage 624 (2d. Ed. 1995).

What is claimed is:

1. A system for a storage device, comprising:
an access controller configured to control access requests to a storage device by metering access to data within a first predefined region within the storage device and by allowing unmetered access to data within a second predefined region within the storage device;
wherein the access controller is configured to determine if each received access request is to be metered or unmetered based on at least whether the access request is directed to the first predefined region or the second predefined region.

2. The system of claim 1, where the system is embedded in one of, a database system, an operating system, and an application configured to process access requests to the storage device.

3. The system of claim 1, where the system further includes allocation logic configured to determine a priority for data to be written to the storage device and causing the data to be stored within the first region or the second region based on the priority.

4. The system of claim 3 where the priority of the data includes a plurality of priority levels.

5. The system of claim 1 where the storage device includes one or more disk drives.

6. The system of claim 1 where the storage device includes a disk and where the second predefined region is defined closer to a perimeter of the disk than the first predefined region.

7. The system of claim 6 where the first predefined region and the second predefined region are defined by one or more logical block addresses.

8. The system of claim 1, where the system is embedded in a file system configured to process data input and output requests to the storage device.

9. The system of claim 1 where the access requests include at least one of data input and data output requests.

10. The system of claim 1, where the access controller is configured to meter access based on a threshold of access requests directed to the data within the first predefined region.

11. The system of claim 1 further including one or more tables configured to define at least the data in the first predefined region to be metered.

12. The system of claim 11 where the data in the one or more tables is configured to define one or more of, a file, an application, and a data location.

13. A method, comprising:
   receiving access requests to a storage device;
   determining, for each access request, whether the access request is directed to at least a first predefined region within the storage device or a second predefined region within the storage device; and
   increasing response time for access requests to the first predefined region within the storage device by metering access requests directed to the second predefined region within the storage device;
   where the metering includes limiting a number of access requests to the second predefined region based in part on a threshold number of the access requests to the second predefined region.

14. The method of claim 13 further including storing data to be metered within the storage device based on a priority level of the data.

15. The method of claim 13 further including determining, for a selected data, whether the selected data will be stored within the first region or the second region.

16. The method of claim 13 further including:
   defining a plurality of regions within the storage device; and
   assigning a metering threshold for selected regions of the plurality of regions.

17. The method of claim 16 where the plurality of regions are defined by setting one or more addresses within the storage device.

18. The method of claim 13 further including:
   monitoring a number of access requests to the second region; and
   initiating the metering when the number of access requests reaches a threshold.

19. A non-transitory computer-readable storage medium storing processor executable instructions, the processor executable instructions comprising instructions for:
   processing access requests to a storage device; and
   controlling each of the access requests to the storage by metering access to data within a first predefined region within the storage device and by allowing unmetered access to data within a second predefined region within the storage device;
   wherein each access request is metered or unmetered based on at least the first or second predefined region that is associated with the access request.

20. The non-transitory computer-readable storage medium as set forth in claim 19 where the storage device includes a disk drive.

21. The non-transitory computer-readable storage medium as set forth in claim 19 further including processor executable instructions operable to cause a processor to store data to the storage device based on a priority of the data, the data being stored in one of the first predefined region or the second predefined region.

22. A non-transitory computer-readable storage medium storing processor executable instructions operable to perform a method, the method comprising:
   processing access requests that are received, wherein each access request is directed to a region in a storage device;
   controlling each access request received based on at least the region that is associated with the access request, wherein the controlling includes metering access requests to a first predefined region within the storage device to maintain response time for access requests to a second predefined region within the storage device; and
   setting a threshold value of access requests, where access requests to the first region are caused to be metered after the threshold value of access requests are processed.

23. The non-transitory computer-readable storage medium as set forth in claim 19 where the metering includes limiting a number of the access requests to the first predefined region from being processed based on at least the region associated with the access request.

24. The non-transitory computer-readable storage medium as set forth in claim 19 where the processing includes determining to which region each of the access requests is directed.

25. The non-transitory computer-readable storage medium as set forth in claim 19 further including processor executable instructions operable to cause a processor to define at least the first region and the second region within the storage device.

26. The non-transitory computer-readable storage medium as set forth in claim 19 including means for allocating data to a selected region within the storage device.

27. The non-transitory computer-readable storage medium as set forth in claim 19 where the computer-readable medium is integrated with at least one of: a data base system, a file system, an operating system, and the storage device.

28. The non-transitory computer-readable storage medium as set forth in claim 19 further including access controller means for metering access requests to the first predefined region based on the region requested by the access request.

29. A database system configured to process access requests to a storage device, the system comprising:
   allocation logic configured to define a plurality of regions within the storage device based on information received from a user;
   threshold logic configured to assign a metering threshold to one or more selected regions of the plurality of regions; and an access controller configured to process each received access request to the storage device based on at least a region that the access request is directed to, the access controller including logic configured to meter access requests to a selected region of the plurality of regions once a metering threshold for the selected region is met.

30. The database system of claim 29 where the allocation logic is further configured to cause selected data to be placed within a selected region of the plurality of regions based on a frequency of access to the selected data.

31. The database system of claim 29 where the access controller includes means for metering access requests.

32. A computer implemented method, comprising:
receiving, by a controller, access requests to a storage device;
determining, by the controller, if each access request received is to be metered or unmetered based on at least whether the access request is directed to a first predefined region or a second predefined region; and
increasing response time for access requests to the first predefined region within the storage device by providing unmetered access to the first predefined region while metering access requests to the second predefined region within the storage device.

* * * * *

UNITED STATES PATENT AND TRADEMARK OFFICE
CERTIFICATE OF CORRECTION

PATENT NO.          : 8,788,764 B2
APPLICATION NO.     : 10/681618
DATED               : July 22, 2014
INVENTOR(S)         : Williams et al.

It is certified that error appears in the above-identified patent and that said Letters Patent is hereby corrected as shown below:

In the Specification,

In column 2, line 67, delete "servelet," and insert -- servlet, --, therefor.

In column 10, line 53, delete "Modem" and insert -- Modern --, therefor.

Signed and Sealed this
Twenty-fourth Day of February, 2015

Michelle K. Lee
*Deputy Director of the United States Patent and Trademark Office*